Patented Apr. 17, 1934

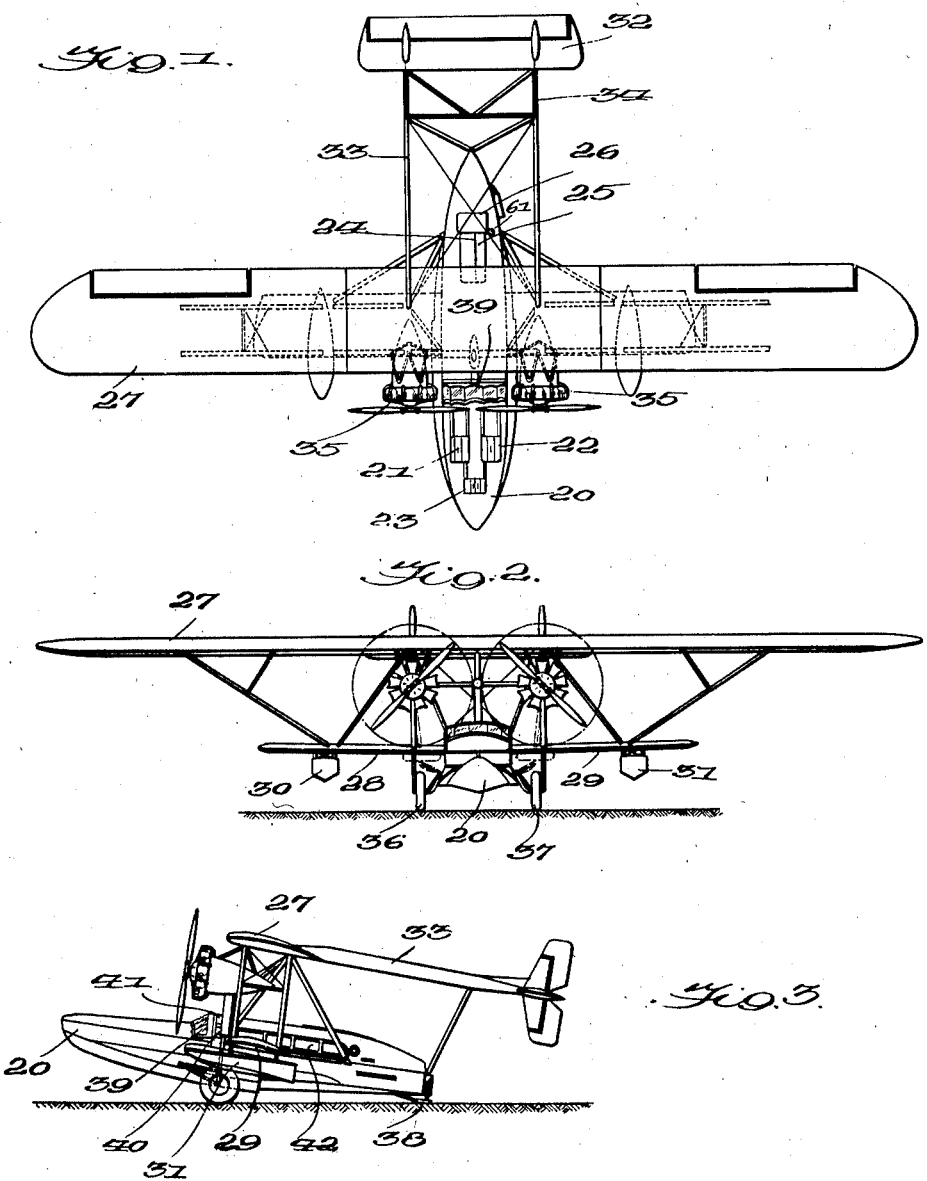

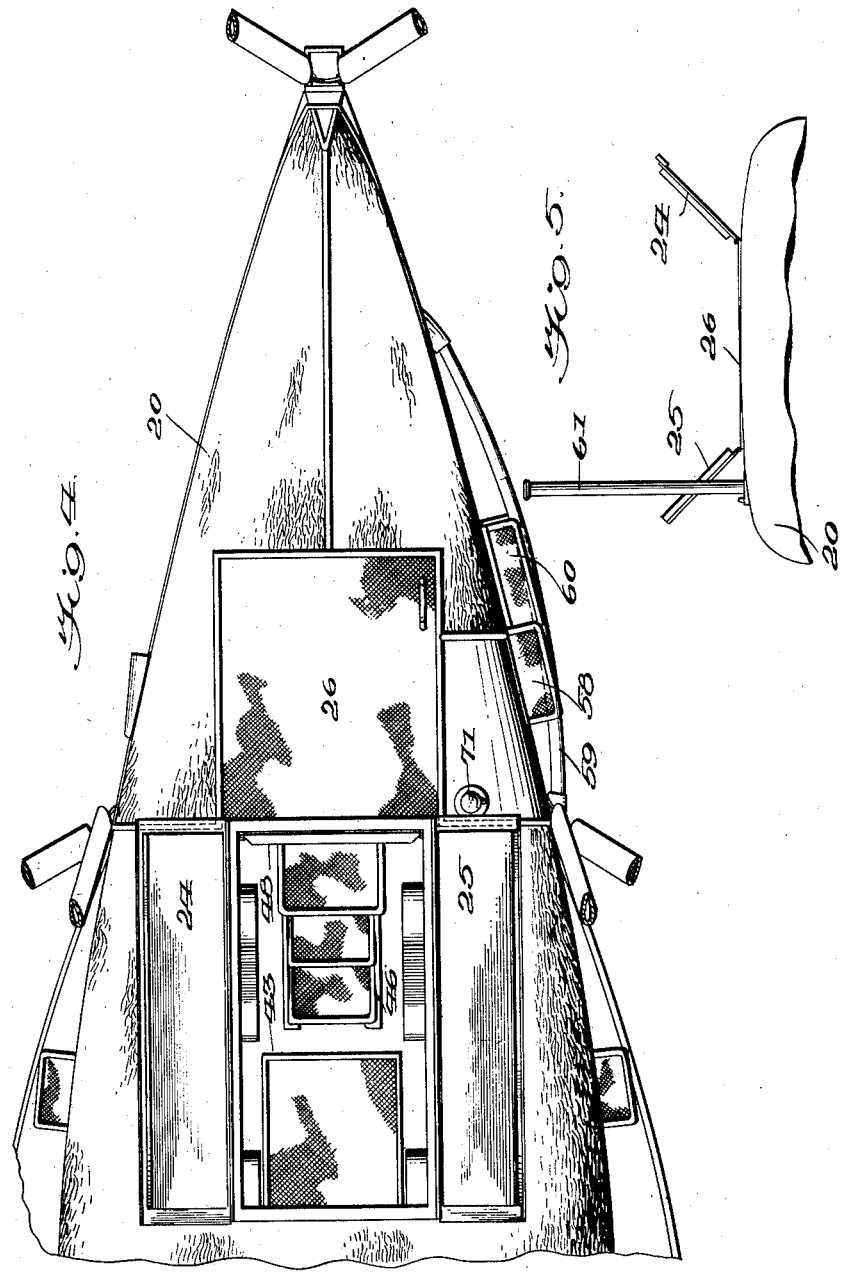

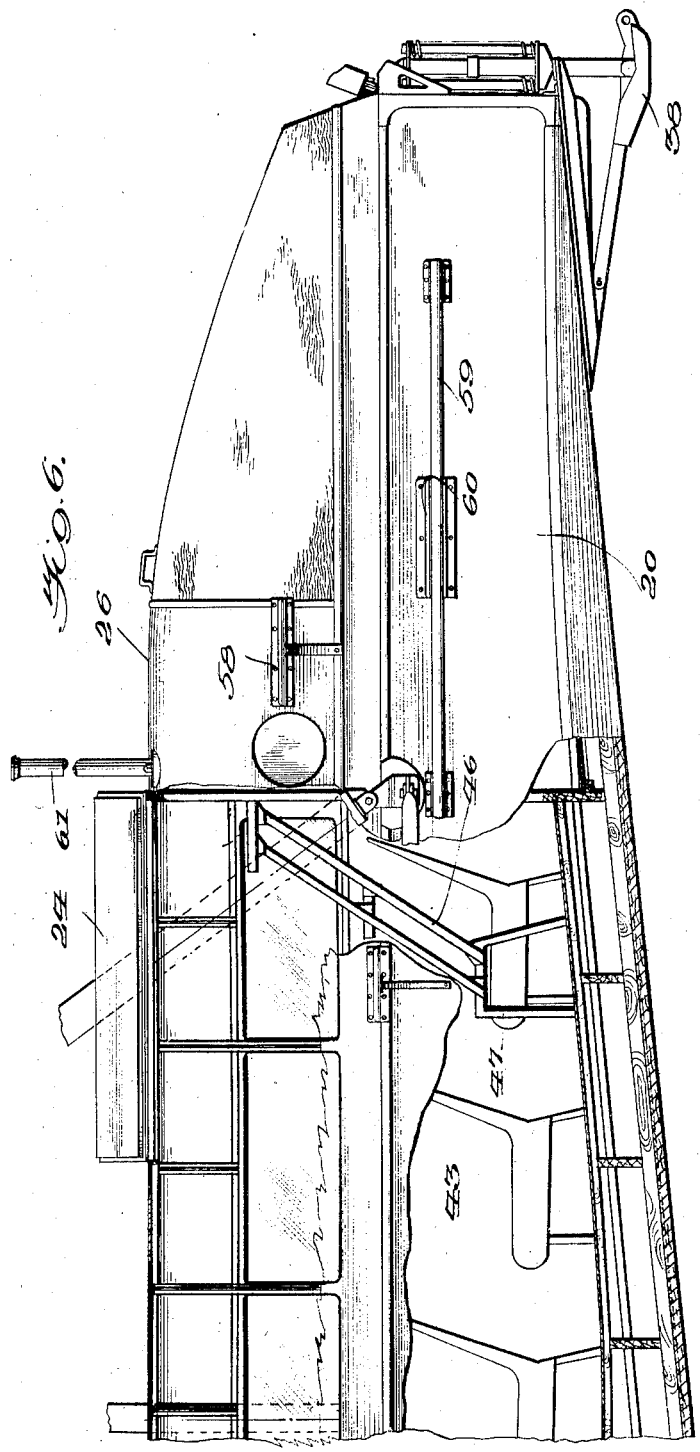

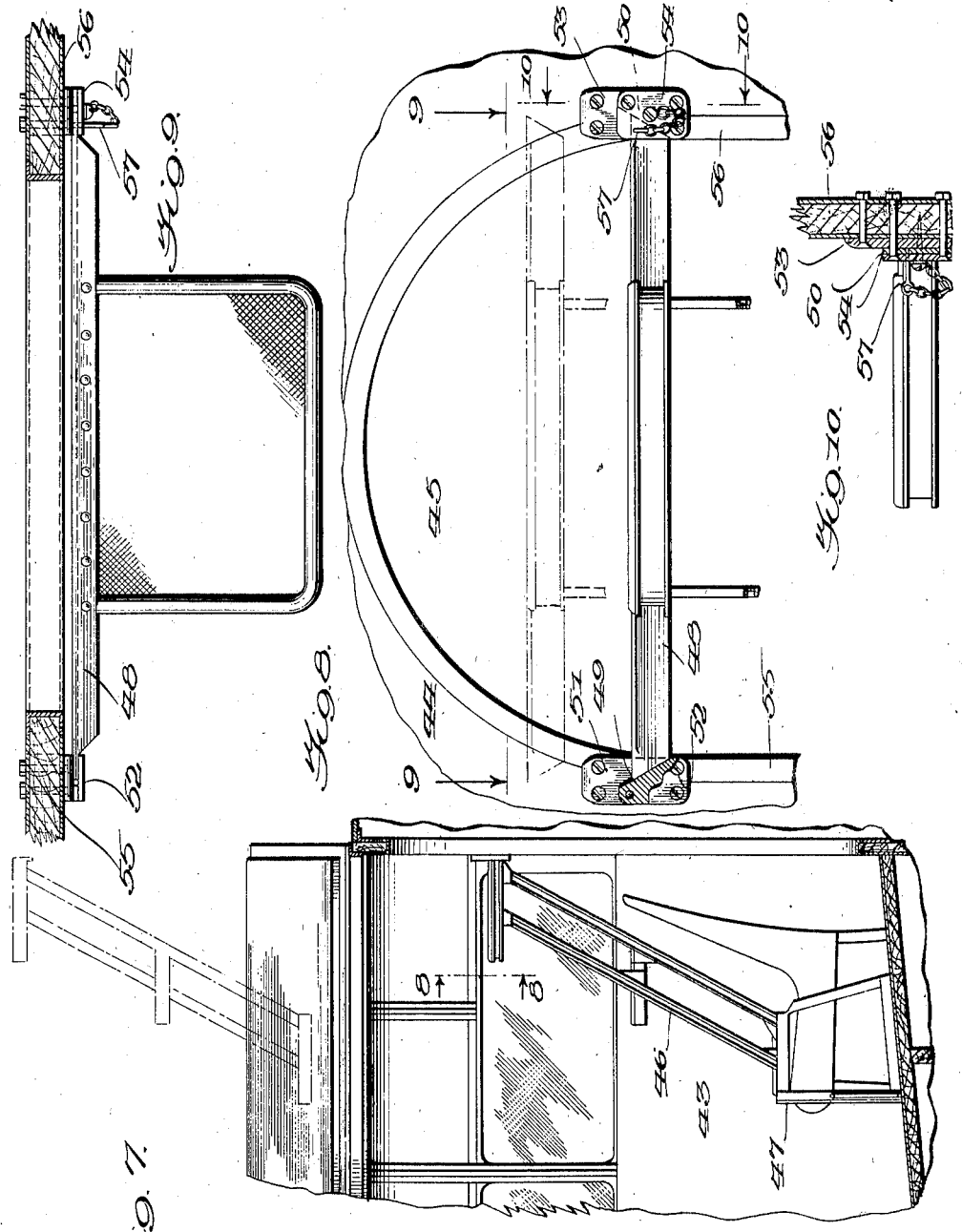

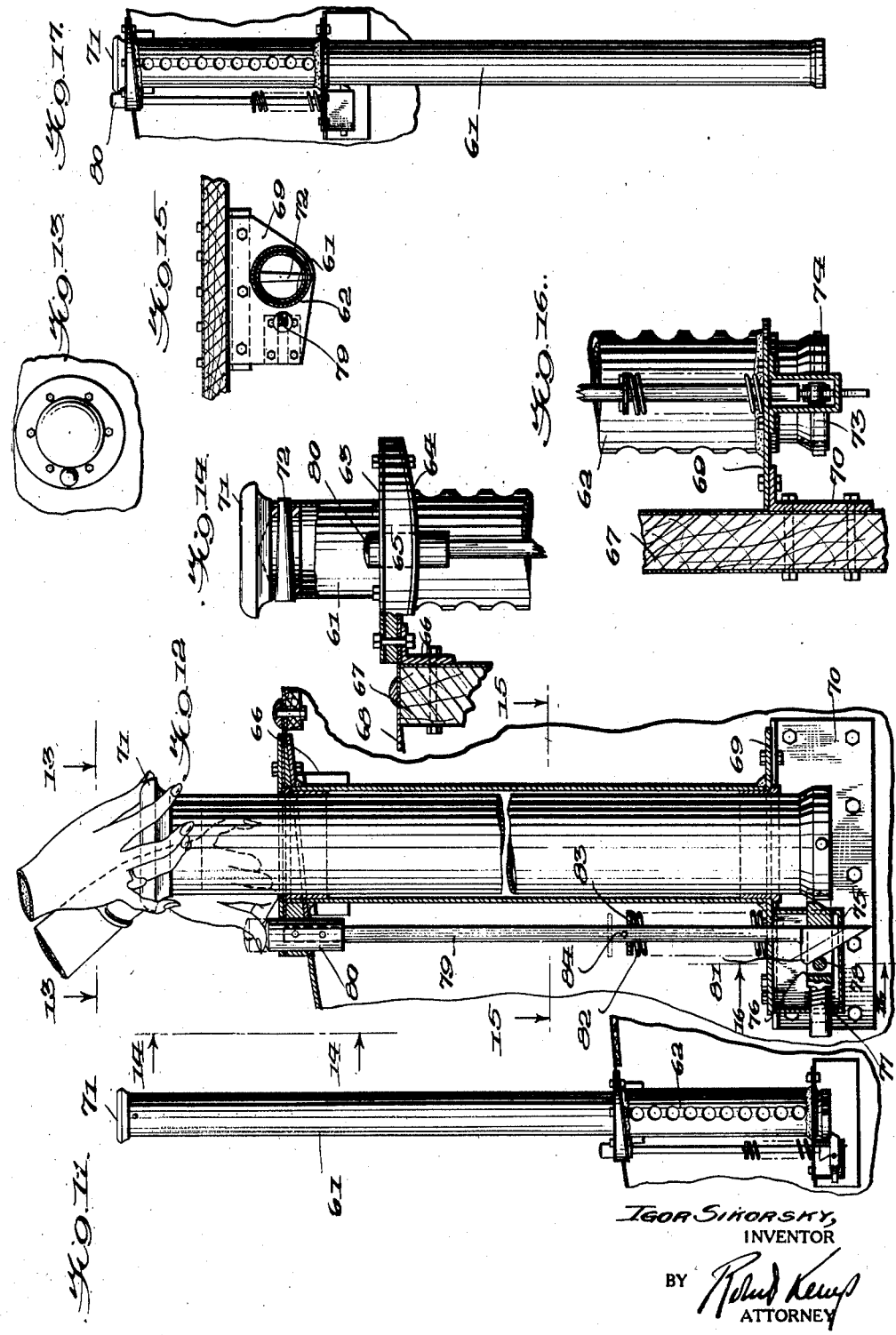

1,955,256

UNITED STATES PATENT OFFICE 1,955,256

AIRCRAFT, INCLUDING MEANS FOR ENTERING AND LEAVING SAME

Igor Sikorsky, College Point, N. Y., assignor to Sikorsky Aviation Corporation, Wilmington, Del., a corporation of Delaware Application June 5, 1929, Serial No. 368,551

7 Claims. (Cl. 244—30)

The object of this invention is to increase the convenience and safety to passengers entering and exiting aircraft and the body structures of aerial vehicles. It is especially convenient for amphibian aircraft which receive and discharge passengers on land and water.

It embraces such features as a water-tight hatch, a removable interior stairway, a telescopic hand stanchion and steps leading up to an entrance platform, the steps being positioned with reference to the stanchion to enable passengers to at all times have a steady and firm grasp of the stanchion while climbing or descending either the outside or the inside pair of stairs.

In the preferred embodiment the stanchion is a disappearing member which when out of use may be concealed for the most part below the surface of the body structure or inside of the aircraft in this way being out of the airstream passing over the body of the aerial vehicle. The stanchion may be lifted into its extended position manually with ease and when once extended will automatically be locked in that position. By the pressing of a small button the lock may be released permitting the disappearance of the stanchion for the most part below the deck or into the aircraft body structure.

Another feature of the invention is a demountable stairway which is held in place by a cross member fitting snugly into brackets located on a bulk-head inside of the body.

A further feature comprises a combination hand rail and step, the hand rail also serving as a bumper means to keep the body boat structure of the amphibian from coming too close to piers, wharves or the like.

The disappearing stanchion may be grasped by a person entering or leaving the body boat structure and because of its convenient location the passenger may continue to hold fast to it while he is both ascending and descending either the external or the internal steps of the aerial vehicle.

In the accompanying drawings, I have illustrated the invention as applied to the land-water type of aircraft commonly known as amphibians. It is to be understood, however, that while certain phases of the invention are peculiarly applicable to this type of machine, the invention as a whole is applicable to all types of aircraft. In the drawings:

Figure 1 is a plan view of an amphibian.

Figure 2 is a front elevation of the amphibian.

Figure 3 is a side elevation of the same.

Figure 4 is a plan view of the rear portion of the amphibian body boat.

Figure 5 is a partial view of the amphibian body boat as seen from the rear of Figure 4.

Figure 6 is a side elevation of the rear portion of the body boat with parts broken away.

Figure 7 is a vertical longitudinal section of a portion of the body boat.

Figure 8 is a view of certain interior structure of the body boat, as seen in the direction of arrows 8—8 of Figure 7.

Figure 9 is a section on line 9—9 of Figure 8.

Figure 10 is a section on the line 10—10 of Figure 9.

Figure 11 is an elevation of the stanchion and its supporting means.

Figure 12 is an elevation of the stanchion with its supporting means shown in section.

Figure 13 is a view of the stanchion seen in the direction of the arrows 13—13 of Figure 12.

Figure 14 is a view of the stanchion and its supporting means seen in the direction of the arrows 14—14 of Figure 12.

Figure 15 is a section on line 15—15 of Figure 12.

Figure 16 is a section on line 16—16 of Figure 12, and

Figure 17 is an elevation of the stanchion and its supporting means, the stanchion being in its lower position as opposed to the showing of Figure 11.

Referring to the drawings, the reference numeral 20 designates the body boat of the amphibian, the deck or roof of which is provided with sliding hatches 21, 22, 23, and swinging hatches 24 and 25, the latter being just forward of a platform 26.

A main plane 27 is spaced above the body boat while lower planes 28 and 29 project laterally of the body boat and are connected with the main or upper plane through interplane struts, as indicated particularly in Figure 2. Pontoons 30 and 31 are supported beneath the outer portions of wings 28 and 29, while an empennage 32 is supported at the ends of outriggers 33 and 34, which project rearwardly of the main plane in symmetrical relation to the longitudinal axis of the body boat. Suitable struts and braces are arranged between the outriggers and upper wing and the body boat, but the arrangement of these members is immaterial so far as the present invention is concerned. A motor 35 is suspended beneath the main plane and somewhat forward thereof, in line with each of outriggers 33 and 34.

The machine is provided with landing wheels 36 and 37 which, through mechanism forming no part of the present invention, may be moved from the operative position shown in full lines in Figure 2, to the inoperative position shown in dotted lines in that figure. A tail skid 38 serves to support the rear end of the body boat on the ground.

Hatches 21, 22 and 23 give access to watertight compartments in the bow of the body boat, and to the rear of these compartments is arranged a pilot's compartment having forward windows 39, Figures 1 and 3, and side and top windows 40 and 41. To the rear of the pilot's compartment is a passenger compartment having side windows 42. Hatches 24 and 25 give access to the rear end of the pilot's compartment and the passenger compartment which, in Figures 4, 6 and 7, is denoted by the numeral 43. The passenger compartment is separated from a stern compartment, which is utilized as a toilet, by a partition 44 in which is formed a doorway 45. Entrance to and exit from the passenger compartment is accomplished via platform 26 and internal and external steps. The internal steps form part of a ladder or stairway 46 which, at its lower end, rests on a pedestal or frame 47. At its upper end ladder 46 is provided with a cross bar 48 whose downwardly and inwardly bevelled ends rest against similar faces of the blocks 49 and 50 secured between plates 51, 52, 53 and 54 which are secured by means of screws to door jambs 55 and 56, Figure 8. Blocks 49 and 50 serve to center bar 48 and the ladder automatically, while plates 51 to 54 prevent accidental fore and aft displacement of the bar when the ladder is in operative position. The ladder is adapted to be retained in this position by means of a pin 57 engaging in aligned apertures of plate 54 and the end of bar 48. Upon removal of pin 57, however, the ladder may be displaced upwardly as indicated in dotted lines in Figures 7 and 8, and removed to give access to doorway 45.

Exteriorly, the body boat is provided with a step plate 58 and a combined hand rail and fender or bumper 59 between which and the body boat is supported another step plate 60. The gangway thus includes ladder 46, platform 26 and steps 58 and 60, the two step portions being in angular relation to each other. At the junction of these portions is arranged the stanchion 61 so as to be accessible from either portion and from platform 26. Referring particularly to Figures 11 to 17, it will be seen that stanchion 61 is slidable in a tubular guideway 62 which, for the sake of lightness, may be provided with suitable cut-outs. The upper end of guide member 62 is welded to a combined bracket and fitting comprising upper and lower plates 63 and 64, an intermediate wedge shaped block 65, and an angle member 66, which latter is secured to a rib 67. The numeral 68 denotes the outer sheathing of the body boat.

A bracket comprising a plate 69 and an angle member 70 is secured to rib 67 directly beneath the bracket above described, and the lower end of member 62 is welded in an aperture of plate 69 so that the guide member is rigidly secured at its ends in vertical position.

Stanchion 61 is provided at its upper end with a cap 71 retained in position by means of a pin 72. At its lower end the stanchion is provided with an external ring 73 having a bevelled upper face and secured in position by means of a pin 74. Cap 71 serves to limit the downward movement of the stanchion through engagement with plate 63, as is shown in Figure 17, while collar 73 serves to limit the upward movement of the stanchion through abutment with plate 69.

Secured beneath plate 69 adjacent the stanchion is a rectangular frame 75 in aligned apertures of which is slidable a latch 76 in a substantially radial direction relative to stanchion 61. The forward end of the latch is of substantially rectangular section, and is guided in a similar aperture in frame 75 so that movement of the latch about its longitudinal axis is prevented. The nose of the latch is downwardly bevelled and is urged in the direction of the stanchion by means of a compression spring 77 interposed between the rear wall of frame 75 and the enlarged head portion of the latch. The head portion of the latch is provided with a vertical through slot in which is disposed a transverse pin 78.

A plunger or push pin 79 is guided in the upper and lower brackets for sliding movement parallel to stanchion 61. The upper end of the plunger is provided with an enlarged head 80 while its lower end is expanded to form a substantially triangular head 81 projecting in the slot of latch 76. Normally, plunger 79 is yieldably retained in the position shown in Figures 11 and 17 or the dotted line position of Figure 7 by means of a spring 82 interposed between plate 69 and a washer 83 surrounding the plunger and held against upward displacement by means of the pin 84. Upon manual depression of the plunger 79 in the manner illustrated in Figure 12, the cam face of the head 81 coacts with pin 78 to move the latch from the dotted line position of Figure 12 to the full line position.

Normally the nose of latch 76 bears against stanchion 61 as shown in Figure 17. Upon raising the stanchion the latch will eventually be pushed back through engagement with the bevelled face of ring 73 and will then spring under the latter, due to spring 77, to hold the stanchion securely in its upwardly extended position. When the stanchion has served its purpose, plunger 79 is depressed, thereby withdrawing latch 76 and allowing the stanchion to gravitate from the position of Figure 11 to the position of Figure 17 wherein it is substantially out of sight, and thus offers no wind resistance.

While I have necessarily described my invention with some particularity, it will be understood that I do not limit myself except as determined in the following claims.

What I claim is:

1. In water aircraft, a body, a bumper mounted on the outside of said body and a foot plate supported jointly by the body and the bumper.

2. In an aircraft, a body, a bumper mounted on the outside of said body, an external step supported by said body and said bumper, a stanchion adjacent said step to assist entering and leaving said aircraft by the use of said step.

3. In aircraft construction, a body, a bumper on the outside of said body, and a foot plate supported jointly by the body and the bumper, a stanchion adjacent said foot plate, means for attaching the stanchion to the body, said stanchion being movable on said means between exposed and concealed positions and adapted in said exposed position to facilitate entering and leaving said aircraft by said foot plate.

4. In an aircraft, a body, a platform adjacent the top of said body, means to facilitate entering said body from the top thereof, comprising steps secured to said body and leading to said platform, a bumper adjacent the outer portion of one of said steps, said bumper secured to said body and adapted to protect and support said step and a stanchion supported on said body adjacent said platform and said steps and movable in said support between an extended and a retracted position.

5. In aircraft construction, a body, external steps fixedly mounted on the body for entering and leaving said body, a stanchion adjacent said steps, means for attaching the stanchion to the body, said stanchion being movable on said means between exposed and concealed positions and adapted in said exposed position to facilitate entering and leaving said aircraft by said steps.

6. In an aircraft, a body, a stanchion, means for supporting said stanchion on said body, said stanchion being movable in said support from an exposed to a concealed position and from a concealed to an exposed position, and external steps individually mounted on the body adjacent said stanchion so that said stanchion in its exposed position facilitates entering and leaving said aircraft by said steps.

7. In water aircraft, a body boat structure, a passenger compartment therein, a hatchway in said passenger compartment, a stanchion adjacent said hatchway, a support for said stanchion in which said stanchion is adapted to be moved between retracted and extended positions, external steps permanently secured to the body boat structure adjacent said stanchion whereby said stanchion in its extended position facilitates entrance to and exit from said passenger compartment by means of said hatchway and said steps.

IGOR SIKORSKY.